(12) United States Patent
Aluç et al.

(10) Patent No.: US 8,996,504 B2
(45) Date of Patent: Mar. 31, 2015

(54) PLAN CACHING USING DENSITY-BASED CLUSTERING

(75) Inventors: Güneş Aluç, Waterloo (CA); David E. Dehaan, Waterloo (CA); Ivan T. Bowman, Hammonds Plains (CA)

(73) Assignee: Sybase, Inc., Dublin, CA (US)

( * ) Notice: Subject to any disclaimer, the term of this patent is extended or adjusted under 35 U.S.C. 154(b) by 199 days.

(21) Appl. No.: 13/479,342

(22) Filed: May 24, 2012

(65) Prior Publication Data

US 2013/0318069 A1    Nov. 28, 2013

(51) Int. Cl.
*G06F 7/00*    (2006.01)
*G06F 17/30*    (2006.01)

(52) U.S. Cl.
CPC .................. *G06F 17/30463* (2013.01)
USPC ............ 707/718; 707/719; 707/720; 707/721

(58) Field of Classification Search
CPC ................... G06F 17/30442; G06F 17/30457; G06F 17/30463; G06F 17/30469; G06F 17/30474
USPC ............... 707/713, 718, 719, 720, 721, 999.3
See application file for complete search history.

(56) References Cited

U.S. PATENT DOCUMENTS

2008/0222093 A1*    9/2008    Fan et al. ........................... 707/2

OTHER PUBLICATIONS

Tao et al., "Efficient and Accurate Nearest Neighbor and Closes Pair search in High Dimensional Space" published Jul. 2010. Download: http://www.cse.cuhk.edu.hk/~taoyf/paper/tods-lsb.pdf.*

Abhirama, M. et al., "On the Stability of Plan Costs and the Costs of Plan Stability," *Proceedings of the VLDB Endowment*, vol. 3, No. 1, 2010, Singapore, pp. 1137-1148.
Asano, T. et al., "Space-filling curves and their use in the design of geometric data structures," *Theoretical Computer Science*, vol. 181, No. 1, Jul. 15, 1997, pp. 3-15.
Babcock, B. et al., "Towards a Robust Query Optimizer: A Principled and Practical Approach," *SIGMOD 2005*, Jun. 14-16, 2005, pp. 119-130.
Bizarro, P. et al., "Progressive Parametric Query Optimization," *IEEE Transactions on Knowledge and Data Engineering*, vol. 21, No. 4, Apr. 2009, pp. 582-594.
Chaudhuri, S. et al., "Variance Aware Optimization of Parameterized Queries" *SIGMOD '10*, Jun. 6-10, 2010, pp. 531-542.
Chu, F. et al., "Least Expected Cost Query Optimization: An Exercise in Utility," *ACM PODS '99*, 1999, pp. 138-147.
Chu, F. et al., "Least Expected Cost Query Optimization: What Can We Expect?" *ACM PODS 2002*, Jun. 3-6, 2002, pp. 293-302.

(Continued)

*Primary Examiner* — Hares Jami
(74) *Attorney, Agent, or Firm* — Sterne, Kessler, Goldstein & Fox P.L.L.C.

(57) ABSTRACT

A query plan predictor receives a query instance according to a query template having a set of parameters. The query plan predictor determines a plan space point for the query instance which is based upon the set of parameters. The query plan predictor predicts a predicted query plan for the plan space point, which is selected from a map of query plans according to a confidence threshold from a plan cache that includes at least one histogram. Each histogram is representative of a cached query plan in the plan cache combined with a previously-selected locality-sensitive hashing function. The histogram stores a frequency distribution of a mapping of sample plan points for the cached query plan by the locality-sensitive hashing function.

20 Claims, 9 Drawing Sheets

(56) References Cited

OTHER PUBLICATIONS

Deshpande, A. et al., "Adaptive Query Processing," *Foundations and Trends in Databases*, vol. 1, No. 1, 2007, pp. 1-146.
Ghosh, A. et al., "Plan Selection based on Query Clustering," *Proceedings of the 28th VLDB Conference*, 2002, pp. 179-190.
Graefe, G. et al., "Dynamic Query Evaluation Plans," *Proc. ACM SIGMOD Int. Conf. on Management of Data*, 1989, pp. 358-366.
Hulgeri, A. et al., "*ANIPQO*: Almost Non-intrusive Parametric Query Optimization for Nonlinear Cost Functions," *Proceedings of the 28th VLDB Conference*, 2002, pp. 167-178.
Hulgeri, A. et al., "Parametric Query Optimization for Linear and Piecewise Linear Cost Functions," *Proceedings of the 28th VLDB Conference*, 2002, pp. 167-178.
Ilyas, I.F. et al., "Estimating Compilation Time of a Query Optimizer," *SIGMOD 2003*, Jun. 9-12, 2003, p. 373-384.
Ioannidis, Y.E. et al., "Parametric query optimization," *VLDB Journal*, vol. 6, No. 2, May 1997, pp. 132-151.
Jain, A.K. et al., "Data Clustering: A Review," *ACM Computing Surveys*, vol. 31, No. 3, Sep. 1999, pp. 264-323.
Kanungo, T. et al., "An Efficient κ-Means Clustering Algorithm: Analysis and Implementation," *IEEE Transactions on Pattern Analysis and Machine Intelligence*, vol. 24, No. 7, Jul. 2002, pp. 881-892.
Lee, H. et al., "Similarity Join Size Estimation using Locality Sensitive Hashing," *Proceedings of the VLDB Endowment*, vol. 4, No. 6, pp. 338-349.
Low, G., *Plan Caching in SQL Server 2008*, from http://msdn.microsoft.com/en-us/library/ee343986, 35 pages, published Aug. 2009.
Markl, V. et al., "Robust Query Processing through Progressive Optimization," *SIGMOD 2004*, Jun. 13-18, 2004, pp. 660-671.
Reddy, N. et al., "Analyzing Plan Diagrams of Database Query Optimizers," *Proceedings of the 31st VLDB Conference*, 2004, pp. 1228-1239.
*SQL Anywhere Server SQL Usage*, "Plan caching" on pp. 554-555, iAnywhere Solutions, Inc, Copyright 2010.
Tao, Y. et al., "Efficient and Accurate Nearest Neighbor and Closest Pair Search in High-Dimensional Space," *ACM Transactions on Database Systems*, vol. 35, No. 3, Article 20, Jul. 2010, pp. 20:1-20:46.

\* cited by examiner

US 8,996,504 B2

PLAN CACHING USING DENSITY-BASED CLUSTERING

BACKGROUND OF THE INVENTION

1. Field of the Invention

The present embodiments are generally related to determining an optimal query plan for a database query by selecting from a cache of plans organized according to density-based clustering.

2. Background Art

Query plan caching has been widely adopted by relational database management systems (RDMBSs). For frequently executed database queries, query plan optimization consumes a significant portion of total database query execution time. It may be beneficial to cache and reuse an optimized query plan because some frequently executed database queries have a high optimization overhead. A query plan is known as a tree of relational algebra operators which indicate information about choice of algorithm as well as resource allocation. An optimal plan is determined by taking into account recent statistics on data previously obtained as well as current system state. Query plan optimization can become a performance bottleneck, particularly for some queries that do not require much time to execute. Plan caching addresses this problem, i.e. query optimization can be shortened if plans of frequently executed queries are cached and reused.

While query optimization may accurately determine a query plan, currently, determination of an accurate query plan may be very inefficient. In conventional plan caching, the generated plan is chosen based on expected values of certain parameters that characterize the query, data and the current state of system. This is known as the least specific cost plan.

At the two extremes of query plan caching, either the query optimizer is invoked blindly for different instantiations of the query template, resulting in poor caching efficiency, or the plan generated at some expected parameter values is cached and blindly reused for all instantiations of the query template, resulting in performance degradation resulting from executing suboptimal plans.

Therefore, what is needed are system, method and computer program product embodiments for parametric plan caching using density-based clustering.

BRIEF SUMMARY OF THE INVENTION

It is desired that the query plan be determined using an efficient, precise, adaptive and online prediction/caching algorithm. This may be done by populating the cache with promising plans and selecting a cached plan based upon similarity of parameter values.

System, method and computer program product embodiments for parametric plan caching using density-based clustering are provided. A query plan predictor is provided to receive a query instance according to a query template having a set of parameters. A plan space point is determined for the query instance, the plan space point based upon the set of parameters. A query plan is predicted for the plan space point, the predicted query plan selected from a map of query plans according to a confidence threshold from a plan cache that includes at least one histogram, each histogram representative of a cached query plan in the plan cache combined with a previously-selected locality-sensitive hashing function. The histogram stores a frequency distribution of a mapping of sample plan points for the cached query plan by the locality-sensitive hashing function.

Further features and advantages, as well as the structure and operation of various embodiments thereof, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art(s) to make and use the invention.

FIGS. 5(a)-(d) illustrate original plan space points and randomized locality-preserving geometrical transformations, according to example embodiments.

Figure 6:
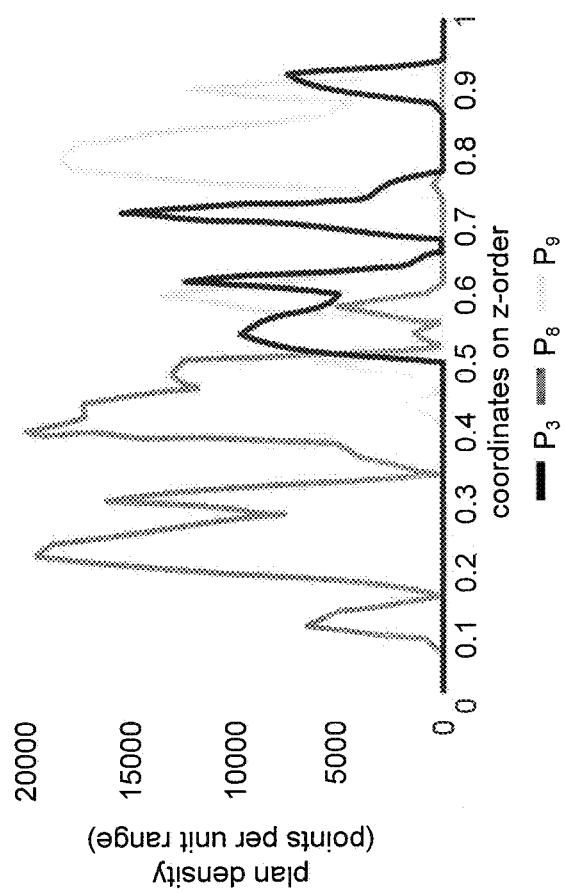

FIG. 6 illustrates a histogram showing multiple plan densities in an example plan space.

Figure 7:
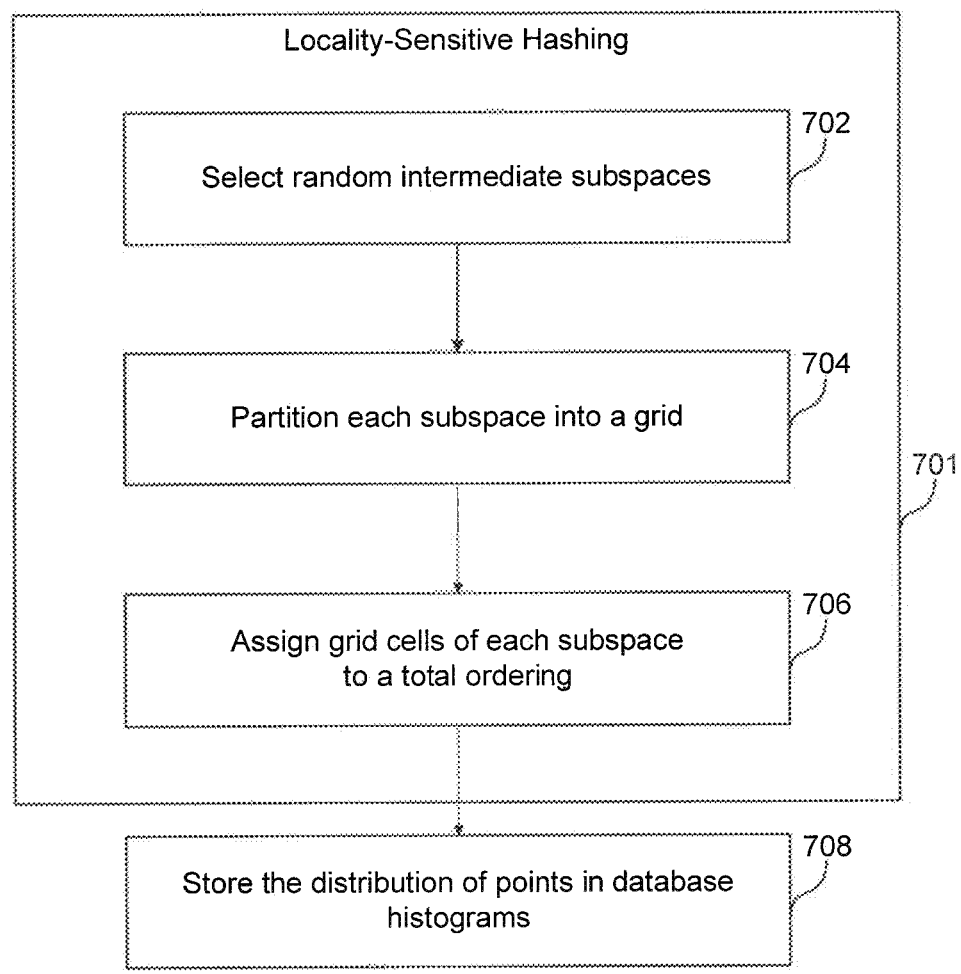

FIG. 7 is a flowchart of a method for creation of histograms, each histogram representing a cached query plan in a plan cache, according to example embodiments.

Figure 8:
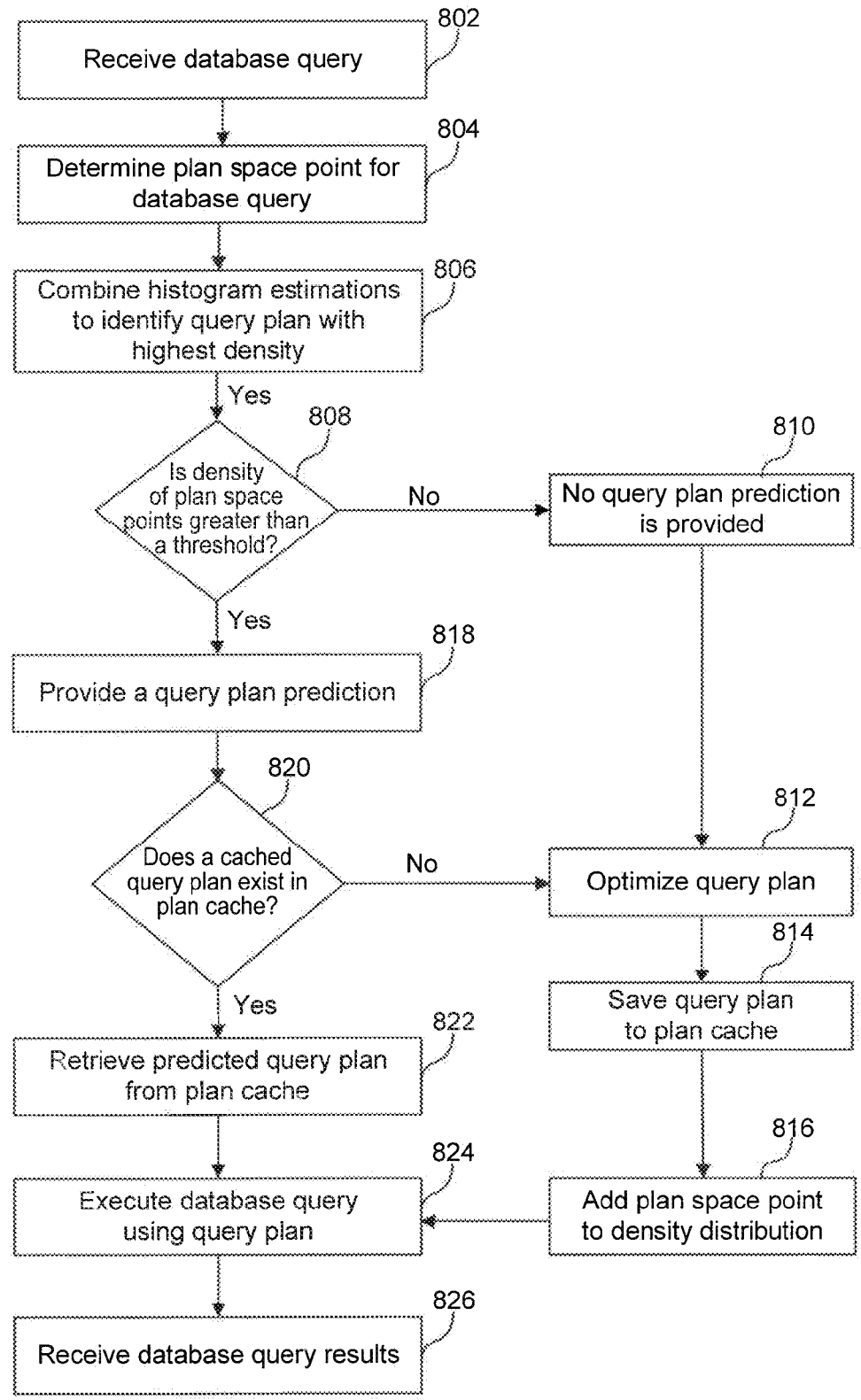

FIG. 8 is a flowchart of a method for executing a database query according to example embodiments.

Figure 9:
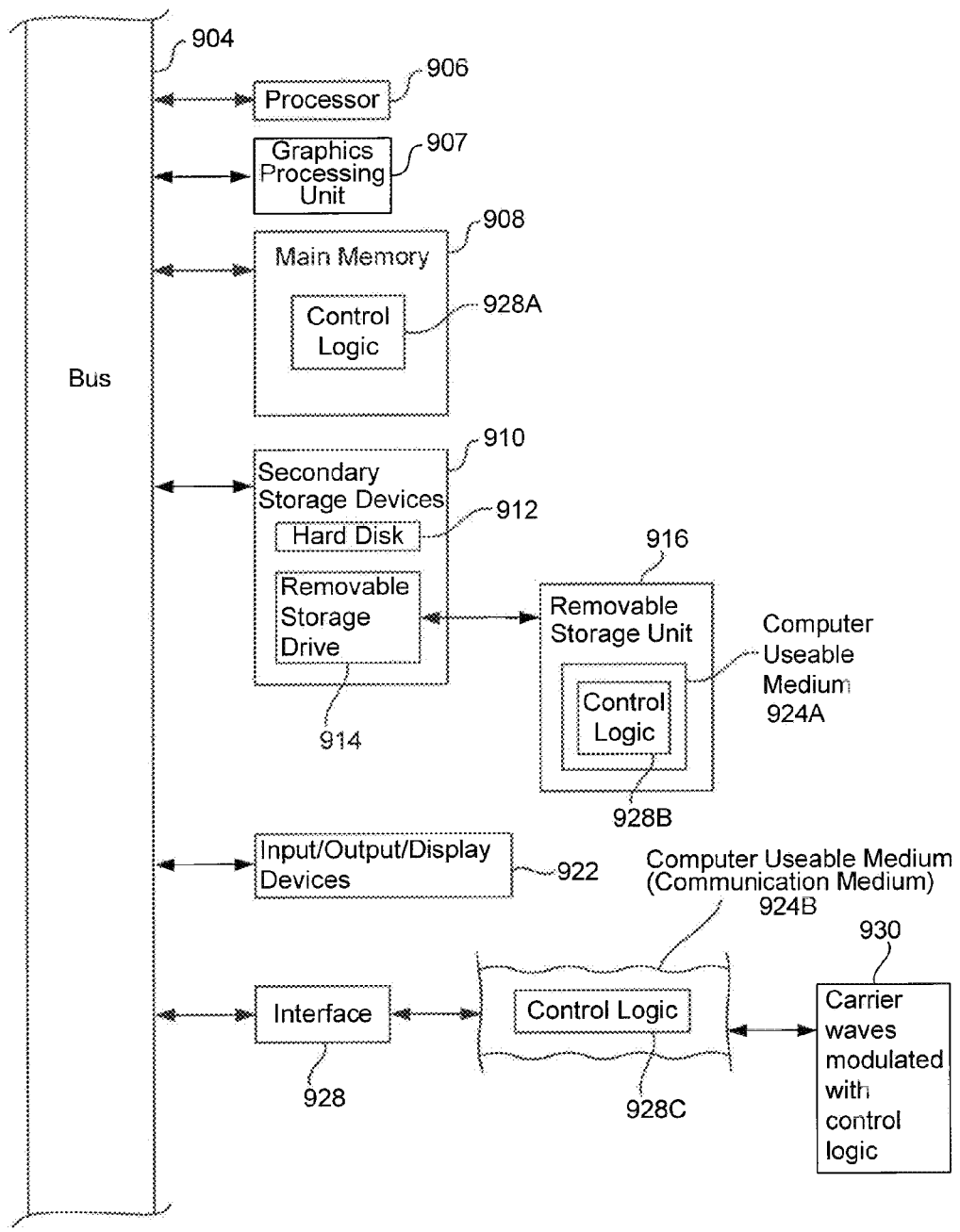

FIG. 9 illustrates an example computer system according to example embodiments.

Features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the embodiments. Therefore, the detailed description is not meant to limit the embodiments. Rather, the scope of the embodiments is defined by the appended claims.

The present invention is directed to parametric plan caching using density-based clustering. For example, this may include receiving a query instance according to a query template having a set of parameters. A plan space point may be determined for the query instance, the plan space point based upon the set of parameters. A predicted query plan may be predicted for the plan space point, the predicted query plan selected from a map of query plans according to a confidence threshold from a plan cache that includes at least one histogram, each histogram representative of a cached query plan in the plan cache combined with a previously-selected locality-sensitive hashing function. The histogram stores a frequency distribution of a mapping of sample plan points for the cached query plan by the locality-sensitive hashing function.

Figure 1:
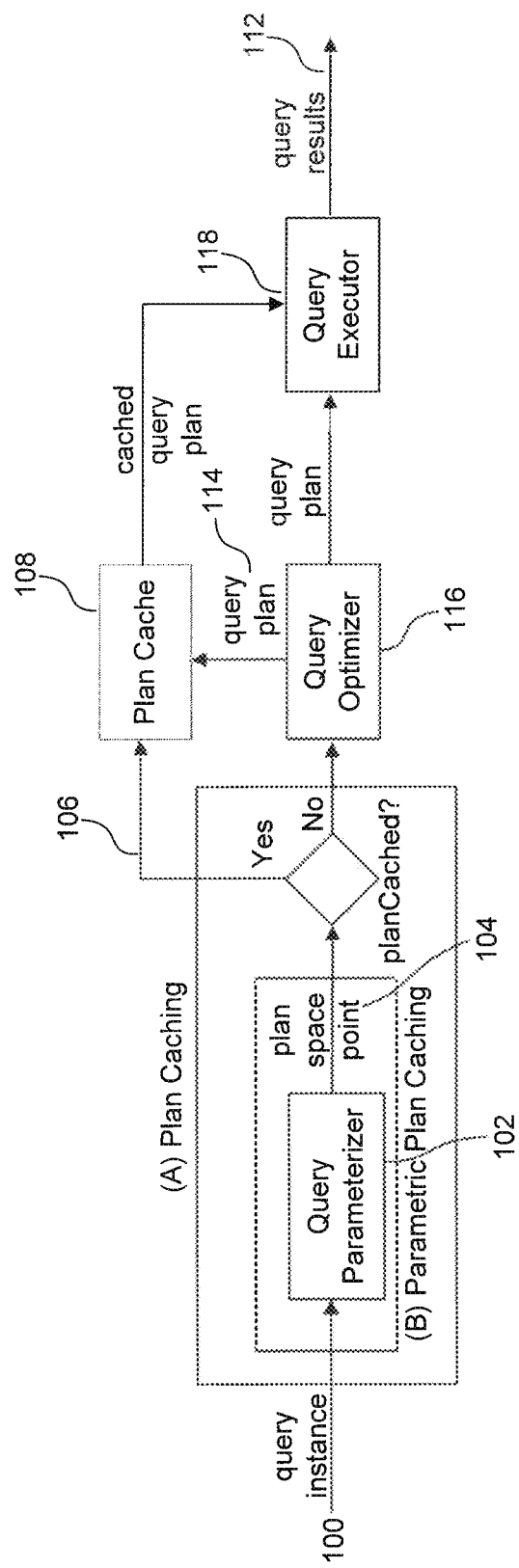
FIG. 1 is a workflow diagram of a database query execution taking advantage of query optimization techniques, according to example embodiments.

FIG. 1 is a workflow diagram for execution of a database query, according to example embodiments. Database query instance 100 is executed by a computing device (not shown). The query instance 100 is parameterized 102 by a query parameterizer and a plan space point 104 is generated. Initially, it may be determined whether there is a matching query plan 106 that is already cached in a plan cache 108. If there is a matching query plan 106 in the plan cache 108, then the cached query plan 106 is used to execute the database query 100 in the query executor 118. Query results 112 are then provided. However, it may be determined that there is not a query plan already cached 106. In that case, a query plan 114 is determined according to query optimization 116 using a query optimizer. This query plan 114 is saved to the plan cache 108. This saved query plan 114 is used to execute the database query 100 in the query executor 118. Query results 112 are then provided. It has been determined that for many database queries, execution of the database query in the query executor 118 is not the largest cost of the database query. Rather, for queries where query optimization time makes up a significant portion of total execution cost, then query optimization 116 may be the largest cost of the database query.

Thus, in embodiments, it is important to not take an "eager" approach, but rather a "lazy" approach to query plan caching. An "eager" approach to query plan caching may result in unnecessary preprocessing and populate a query plan space in advance before any database queries are executed. On the other hand, a "lazy" approach to query plan caching populates a query plan space as database queries are executed. Plan caching allows query optimization to be bypassed if plans of frequently executed queries are cached and reused.

In embodiments, the database query instance 100 may be formed according to a database query template which may be a Structured Query Language (SQL) query that includes explicit and implicit parameters. Explicit template parameters appear as placeholders in a query and are replaced with application-supplied values at execution time. Implicit template parameters represent characteristics of the data or system state that the optimizer uses when selecting an execution plan such as base table sizes, data distribution, cache size, and multiprogramming level. The database query instance 100 is an instantiation of a query template that includes all explicit and implicit values. The parameters of a query template fully determine the execution plan that the RDBMS selects for any query instance. A workload history is a sequence of query instance executions, where each query instance belongs to a particular query template. For each execution, the workload history tracks the optimizer's plan choice and the cost of execution.

As an example, it may be assumed that the workload includes a single query template. We also assume that there is a workload history and that query instances are mapped according to distinct optimizer parameters. Thus, the goal of parametric plan caching is to predict which query plan the query optimizer 116 will choose for a new query instance.

When a new query instance q arrives, it is mapped to a point in the plan space and the algorithm decides whether the new point belongs to any of the formerly identified clusters. If the new point does belong to any of the formerly identified clusters, the cluster is returned. This is accomplished by populating the cache 108 with promising plans and making very precise plan predictions by gracefully indicating when it is not safe to make a plan prediction.

An example query template may be SELECT*FROM part, lineitem, supplier, partsupp WHERE l_partkey=p_partkey AND s_suppkey=ps_suppkey AND s_date<=$v_1$ AND l_date<=$v_2$.

Thus, the output of the algorithm is either a query plan 106 or NULL if a prediction cannot and should not be made because doing so is too "risky." Although it is the desire of the algorithm to make as many predictions as possible, there is a trade-off in accuracy which may result from potentially incorrect predictions. Thus, the algorithm may not make a prediction. The algorithm attempts to maximize recall for a given lower bound on precision. The precision of a series of plan caching predictions is the ratio of the number of correct predictions to the number of NULL-free predictions. Recall is the ratio of the number of correct predictions to the total number of predictions.

To predict the plan for an unlabeled plan space point, a subset of points of the sample plan space points are analyzed within a user-specified radius of the unlabeled plan space point. The highest-frequency plan label in the subset is determined. However, no plan label is returned if a user specified confidence threshold is not met. Density based clustering has been determined to achieve the highest precision because of density-based sanity checks to avoid bad decisions, which are discussed below.

2. An Example Plan Space

Figure 2:
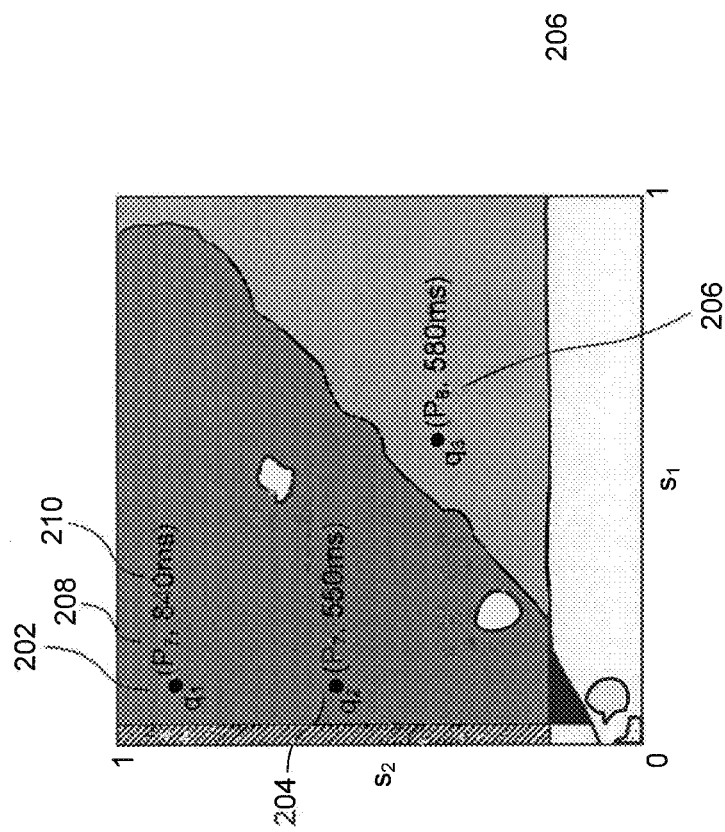
FIG. 2 shows the plan space of an example query having multiple possible query plans.

During execution of the query, information about the plan space of the query is mapped in a lazy manner by mapping each query instance to a point in plan space as shown in FIG. 2. Each point in the plan space is labeled with the optimal query plan and the plan's execution cost at that point. Points are then clustered by plan identifier.

For each new query instance, the inventive clustering algorithm determines whether the corresponding plan space point is associated with any of the clusters. If the plan space point is associated with one of the clusters, then the associated plan 106 is reused from the cache 108. However, if the plan space point is not associated with one of the clusters, then the query is optimized 116 and its plan space point 114 is added to the plan cache 108. Performance of the inventive clustering algorithm is monitored in order to determine which plans to delete from the cache, as well as to detect significant changes in the plan spaces as a result of fluctuations in workload, data characteristics or system state.

As an example, as shown in FIG. 2, a plan space 200 is shown of query template $Q_1$. Each of the different shades represents a unique query plan. For a query template $Q_t$, r different optimizer parameters and a choice of plan(f(q)): $\phi_t \to P$ such that f: $\phi_t \to [0, 1]^r$ and plan: $[0, 1]^r \to P$, the plan space of $Q_t$ for the selected optimizer parameters is the set of mapping induced by plan.

Thus, as shown in FIG. 2, $Q_1$ may result in three different query instances, $q_1$, $q_2$ and $q_3$. For each of the query instances $q_1$, $q_2$ and $q_3$ (202, 204 and 206), a particular query plan chosen and the cost of execution is noted. Thus, for each execution of $q_1$, $q_2$ and $q_3$, the plan choice ($P_7$, $P_7$ and $P_8$) 208 and the cost of execution (840 ms, 550 ms and 580 ms) 210 are stored in a workload history 212 (not shown) for the query template $Q_1$. Predicate selectivities are critical inputs in modeling the costs of query plans and in plan selection and are shown as the x and y axis in FIG. 2. As an example, the selectivities of s_date<=$v_1$ and l_date<–$v_2$ may be optimizer parameters of interest.

3. BASELINE Algorithm

In embodiments, the BASELINE algorithm shown below may be used to determine a query plan that is very precise, but this algorithm is not efficient or adaptive and is improved according to the example embodiments described below.

```
Baseline Algorithm
Input: query plans P, sample plan space points X, unlabeled plan
space point x, radius d, and confidence threshold c
for all plan space points X do
    if | x_i – x | ≤ d, then
        density[plan (x_i)]++
    End if
End for
For all query plans P do
    totalDensity = totalDensity + density[p_i]
    if density[p_i] > density[max] then
        max = p_i
    End if
End for
Ratio = density[max] / (totalDensity – density[max])
If (sin getConfidenceAngle(ratio)) > c then
    Return max
End if
Return NULL
```

BASELINE returns either a query plan pi having the highest density in a plan space 200 or NULL. BASELINE requires storing all sample set points in order to yield acceptable recall for a high confidence threshold. In addition, BASELINE cannot detect when characteristics of the sample plan spaces may have changed.

4. Improvements to BASELINE

The memory and computational budgets of an RDBMS plan caching component are small, yet BASELINE requires storing all of the sample points. Because the quality of predictions depends on the sample points, the sample set of points may need to be large in order to yield acceptable recall for a high confidence threshold. In addition, BASELINE cannot modify sample points over time, and lacks a mechanism to detect when characteristics of the sampled plan spaces have changed. If the sample points are not indexed, they must all be scanned. However it is too expensive to scan all points. Thus, in embodiments, the BASELINE algorithm can be modified in order to improve parametric query plan prediction.

In an embodiment, the BASELINE algorithm makes predictions by comparing exact values of plan densities within a fixed radius of the given plan space point. This approach is known as a "density-based" clustering algorithm. Embodiments may use other common clustering strategies as possible ways to cluster points in plan space 200, including but not limited to "centroid-based" clustering algorithms and "proximity-based" clustering algorithms.

Figure 3:
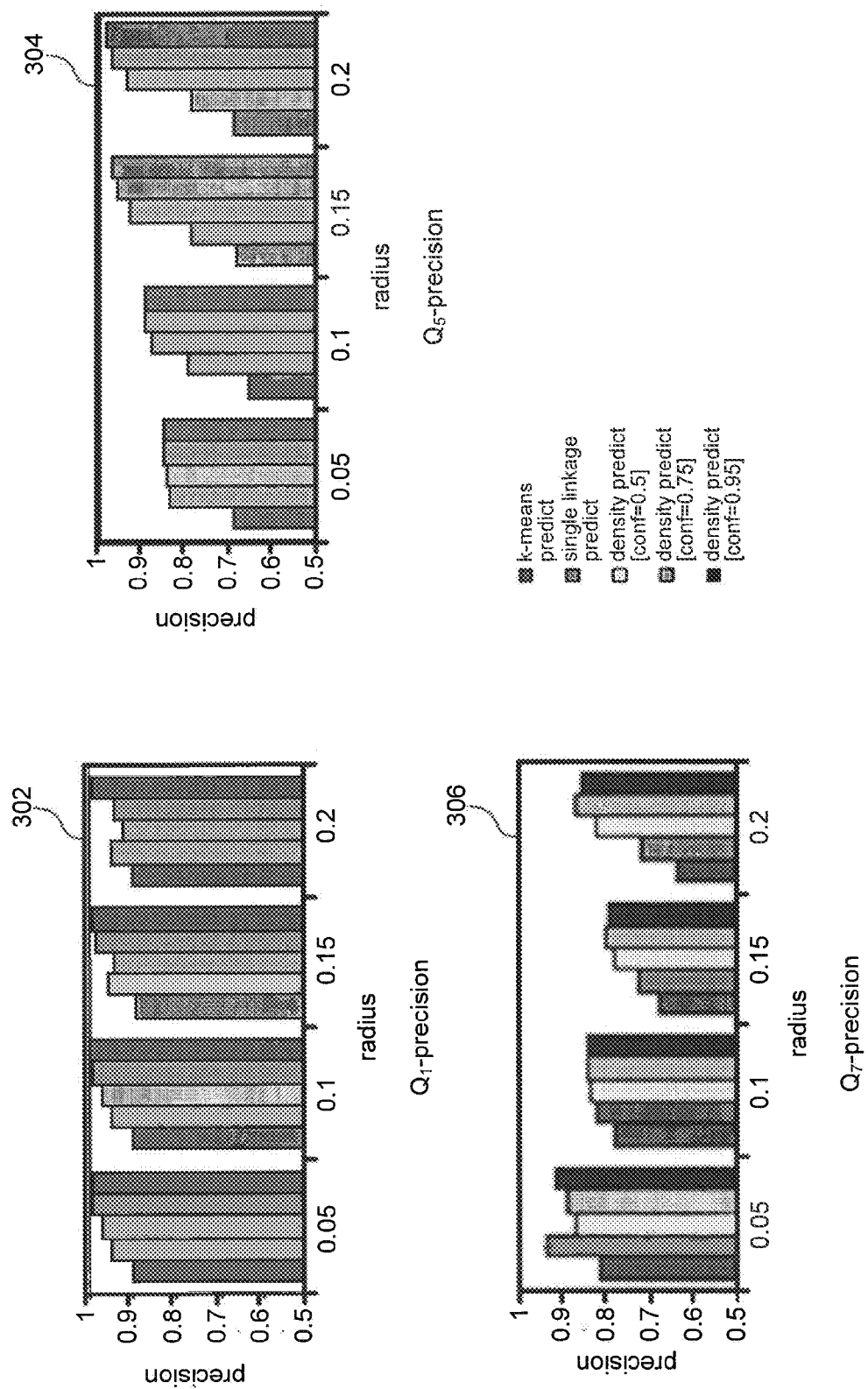
FIG. 3 illustrates a quantitative comparison of clustering methods including K-Means predict, Single Linkage Predict and Density Predict, according to example embodiments.

As shown in FIG. 3, in embodiments, clustering algorithms were compared to understand the behavior of density-based clustering compared to other clustering strategies, in order to determine how to improve BASELINE. FIG. 3 illustrates results for Density Predict (embodied by the BASELINE algorithm with three different example values for the confidence threshold), K-Means Predict (a common centroid-based clustering algorithm) and Single Linkage Predict (a proximity-based clustering algorithm).

In K-Means Predict, sample points are grouped by query plan labels and each group is clustered into c clusters using the K-Means algorithm, c being a user specified integer. To predict the plan for a particular point, the algorithm finds the nearest cluster centroid and returns that cluster's plan label, or NULL if the distance to the nearest cluster centroid exceeds a user-specified radius d.

Regarding Single Linkage Predict, for a particular point, the algorithm finds the nearest point in the sample plan space points and returns its plan label or NULL if the distance to the point exceeds some user-specified radius d.

Regarding Density Predict, in order to predict the plan for a particular point, the algorithm identifies the subset of points in the sample plan space points within some user-specified radius d of the particular point, and returns the highest-frequency plan label in the subset. However, NULL is returned instead if a user-specified confidence threshold is not met.

Compared to K-Means Predict, Single Linkage Predict and Density Predict both achieve much higher precision and recall. Precision and recall for Single Linkage Predict were determined to be comparable to those for Density Predict with a low confidence threshold. However, increasing this threshold allows Density Predict to achieve much better prediction, with a decrease in recall, by avoiding unsafe decisions. Quantitative comparison of K-Means Predict, Single Linkage Predict and Density Predict where the confidence value is set to 0.5, 0.75 and 0.95 are shown in FIG. 3. In particular, 302 shows $Q_1$-precision, 304 shows $Q_5$-precision and 306 shows $Q_7$-precision. These precision values have varying levels of trade-offs in recall for gains in precision. These are described further below as confidence sanity checks. Taking these determinations into consideration, it has been determined that by careful use of confidence thresholds to balance the trade-off between precision and recall, BASELINE may be improved.

Figure 4:
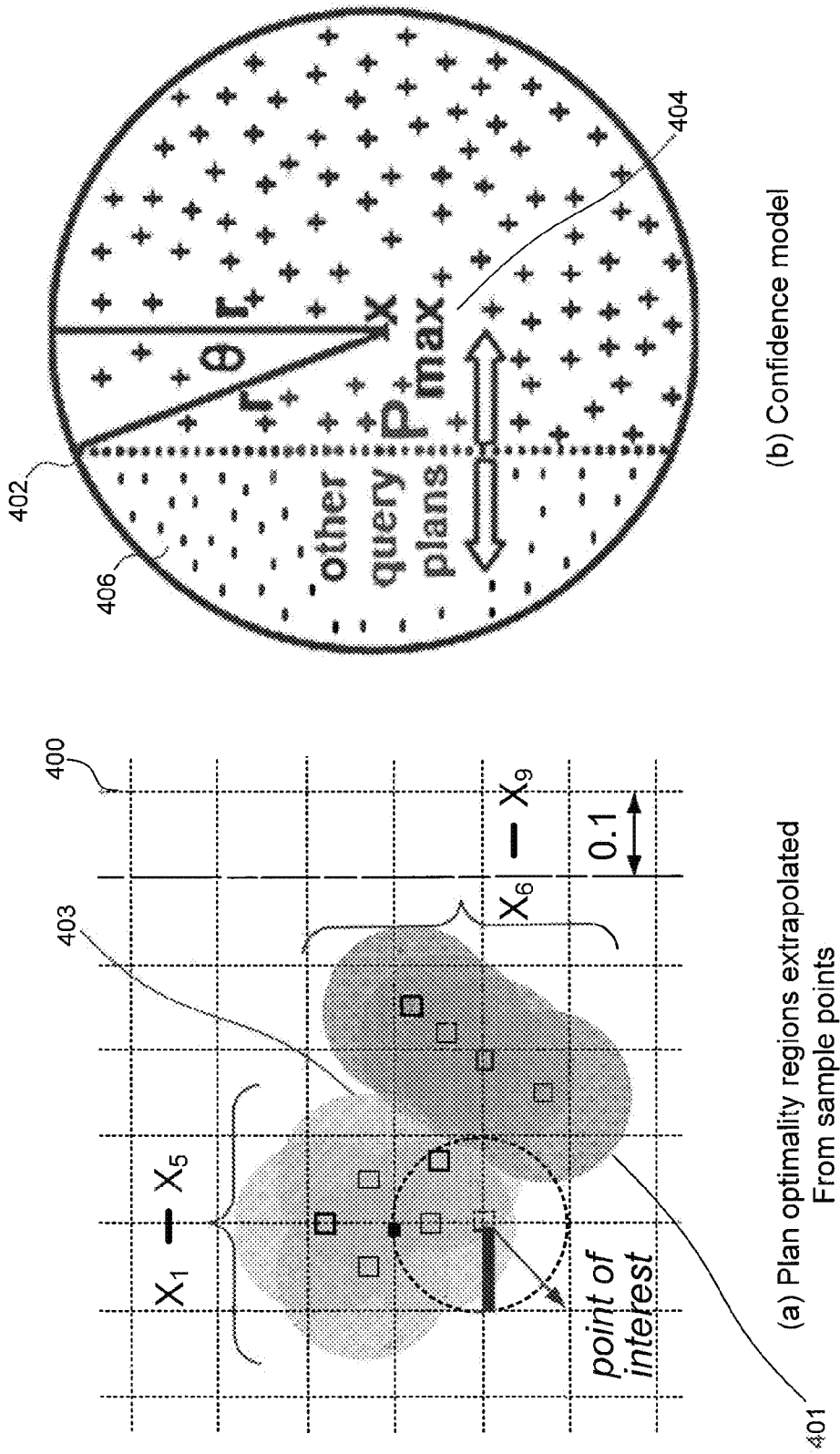
FIG. 4(a) illustrates a method of predicting an optimal plan in a plan space according to example embodiments.
FIG. 4(b) illustrates a confidence model used in plan prediction according to example embodiments.

In certain embodiments, using FIG. 4 as a reference, a confidence model of BASELINE may be provided. FIG. 4(a) shows an example 400 of a two-dimensional plan space showing n plans which satisfy two plan choice predictability assumptions: given any two points with a distance d=0.1, with a probability of at least 0.9, the two points will have the same query plan. Around each point is shown a circle 401 having a radius of 0.1 with an evenly distributed probability weight 0.9 that other points in that circle share the plan. This is shown in FIG. 4(a) for point sets {$x_1$-$x_5$} and {$x_6$-$x_9$}. Given a new point, confidence in predicting the plan label for the new point should depend upon the intensities of the shading at the new point. Region 403 includes two different types of shading indicating that there are two different types of possible plans. This indicates it is not safe to make a prediction. Regarding plan space boundaries such as at region 403, as shown in FIG. 4(b), it is assumed that the plan space boundary 402 separating $P_{max}$ 404 from another query plan is a line segment splitting the circle into two regions, one including $P_{max}$ and the other including all of the other query plans 406. Density-based clustering becomes more conservative near cluster boundaries when prediction is unsafe.

To assess prediction safety, it is important to consider the relative plan frequencies with a fixed radius as shown in FIG. 4(b). According to this model, the point is within the region $P_{max}$ if and only if a ratio is greater than a value. The ratio is used to compute an angle θ having a value between 0 and π/2 radians. The confidence is then defined as sin(θ).

5. Efficient Approximations of BASELINE

The above improvements to BASELINE address its prediction accuracy, and by implementing these improvements in certain embodiments, BASELINE may demonstrate sufficiently high precision to make it useful for query plan prediction. Unfortunately, BASELINE is a very inefficient algorithm because it requires all plan space points to be stored. In addition, a potentially large number of points must be read in order to make a single prediction, which is not practical. However, various approximations of the BASELINE algorithm may be implemented which substantially reduce the space and time overhead, but yet minimally reduce prediction efficacy.

A naïve method in certain embodiments for reducing the space and time overhead of BASELINE by partitioning the plan space into a grid with grid buckets is referred to as the NAÏVE algorithm. A more refined method applies the NAÏVE algorithm to multiple randomly-generated subspaces, using a technique known as locality-sensitive hashing. This algorithm is known as APPROXIMATE-LSH. The APPROXIMATE-LSH algorithm may be approximated using histograms. This algorithm is known as APPROXIMATE-LSH-HISTOGRAMS.

The NAÏVE algorithm represents the plan space by partitioning the plan space into a grid as shown in FIG. 4(a) and within each grid bucket, recording both the total sample point count and the average plan cost for each query plan. However, a circular point of density may not be approximated accurately from grid buckets since the point of interest may not lie at the center of the bucket. In order to obtain high prediction accuracy comparable to BASELINE, the NAÏVE algorithm requires using a fine-grained grid granularity, which may still incur a large storage overhead.

Figure 5:
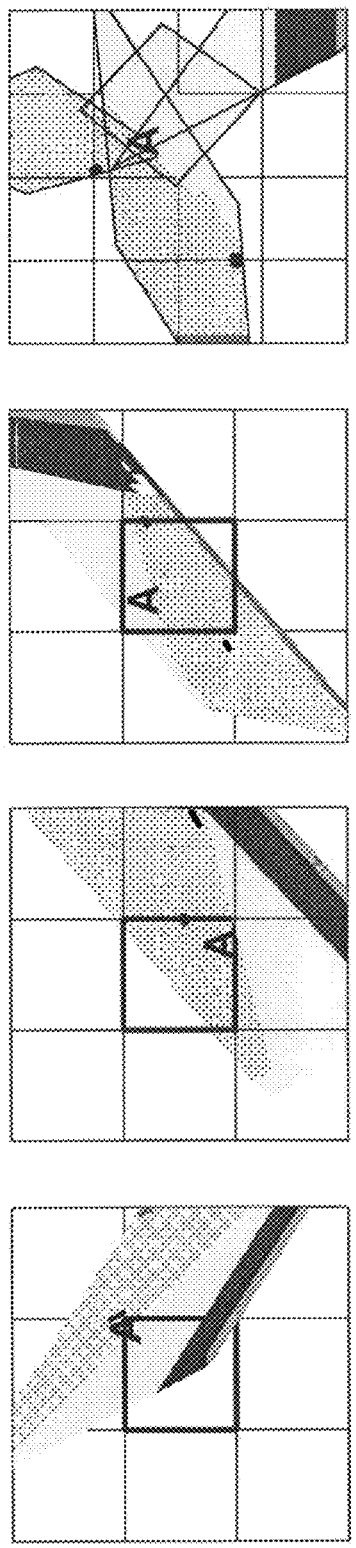

Instead of relying on a single fine-grained grid having a fixed orientation, the NAÏVE algorithm may be improved by combining information from multiple courser-grained grids. For example, geometrical transformations may be applied to the plan space points which alter the actual coordinates, but do not modify the relative orientation. This is shown in FIG. 5. For instance, as, shown in FIG. 5(a), a first transform is shown. In FIG. 5(b), a second transform is shown. In FIG. 5(c) a third transform is shown and FIG. 5(d) shows the original plan space where the rectangular regions correspond to some arbitrary-shaped polygons. In each figure, the rectangular bucket that contains the reference point A is highlighted. Although individually each polygon is a poor approximation of the circular region of a circular point of density around A, intersecting several such polygons yields a more precise approximation.

Intersecting grid cells from simple geometric transformations of the plan space such as shown in FIG. 5 illustrate an example method for combining multiple course-grained approximations. However, in embodiments, it is important to utilize a more sophisticated approach that extends a locality-sensitive hashing technique which is used for nearest neighbor search as proposed in Tao et al., "Efficient and accurate nearest neighbor and closest pair search in high-dimensional space," ACM Trans. Database Syst., vol. 35, pp. 20:1-20:46, 2010, which is incorporated by reference, with a few modifications. While Tao et al. desire the transformations of the plan space to produce points that are as dispersed as possible, in contrast, plan caching is more tolerant of hashing non-nearby plan space points to the same bucket if they belong to the same query plan. Additionally, variates of translation are generated over a much smaller interval, which injects randomness without violating the plan choice predictability assumption.

The following is an extension of the locality-sensitive hashing technique proposed for nearest-neighbor search. Let S be equal to a hypersphere having a volume equal to the volume of an r-dimensional hypercube. Every point within an r-dimensional plan space is first translated by an r-dimensional vector and then scaled so that a new corresponding point lies in a corresponding hypercube. The vertices of the hypercube lie on the surface of S. The points are then stretched until they span the volume of S, which minimizes the shrinking effects of the locality-preserving transformation. Next, s different unit vectors are constructed. Variates of translation are constructed such that each is drawn independently from a range of 0 to $1/\Delta$, where $\Delta$ is the grid resolution along a single axis. The new coordinates of the points in the s-dimensional space are computed by projecting the points onto each unit vector and shifting them by the corresponding variate of translation. Then the points are assigned to buckets based on the chosen grid resolution. Given a point of interest, the NAÏVE algorithm is applied independently to each intermediate space to obtain t different estimations for each of the plan densities surrounding the point and the median estimation is selected for each plan. As noted above, this algorithm is known as APPROXIMATE-LSH.

In summary, t randomized transformations must also be applied to the points in the plan space thereby producing t intermediate s-dimensional data spaces. The randomized locality-preserving geometrical transformations and the locality-sensitive hashing allows the total plan space point count to vary smoothly across neighboring grid buckets, and this allows for the space overhead to be reduced. As an example, database histograms are stored having distributions of the total number of points across the buckets induced over the plan space. However, in order to utilize unidimensional database histograms, a method is required to map multi-dimensional distributions to a single dimension. To address this problem, z-ordering is used to preserve the locality of the data. A separate histogram is created for every query plan in the plan space. Thus, for a plan space with n distinct query plans, a total of t×n histograms are allocated. As noted above, this algorithm is known as APPROXIMATE-LSH-HISTOGRAMS.

By using standard histogram construction techniques that choose boundaries to minimize estimation error, many similar adjacent cells can be consolidated into a single bucket. Thus, from the histogram storage, substantial savings may be obtained with only a small loss in precision.

The use of z-order introduces two changes. The ordering may place two distant grid cells next to each other within the total ordering. To address this issue, plan space point density must be obtained from the histograms and kept above a constant factor of the total number of plan space points. This sanity check is called noise elimination. In addition, when the ordering splits a contiguous region into non-contiguous intervals, more histogram buckets are required to efficiently store the interval boundaries. It is desirable to control the space overhead of the clustering algorithm by limiting the number of histogram buckets, but this places restrictions on precision and recall. Thus, the algorithm also requires the confidence sanity check as well to maintain high precision. Given a fixed capacity, the confidence sanity check penalizes recall but not precision.

As shown in FIG. 6, from [0.65, 0.95] z-ordering produces two non-contiguous intervals for plan $P_3$, and the gap between the two is filled by $P_9$. However, a problem may occur when a histogram bucket of $P_3$ spans the two non-contiguous intervals as a result of space restrictions. If queried for values outside of the interval boundaries, for example at 0.8, the histogram returns positive values for $P_3$, which is not accurate. This requires use of a confidence sanity check.

The confidence sanity check is required so that a plan prediction is made if and only if the plan's density is significantly greater than the sum of all densities in all other plans in the region. The sanity checks are based on varying levels confidence, i.e. trade-offs in recall versus gains in precision as shown in FIG. 3.

FIG. 7 is a flowchart of a method for creation of histograms, each histogram representing a cached query plan in a plan cache, according to example embodiments. In step 701, according to example embodiments, each point in a plan space is assigned to t different integer values using t locality-sensitive hashing functions. Steps 702, 704 and 706 further describe locality-sensitive hashing. In step 702, t different intermediate subspaces are formed by selecting random unit vectors and variates of translation. Next, in step 704, each of the intermediate subspaces is partitioned into a grid having grid buckets. In step 706, a z-curve is used to assign a total ordering to the grid cells, and so for each intermediate subspace, each point is assigned an integer based upon a position of its grid cell within the total ordering of grid cells in that subspace. As the total number of grid cells grows exponentially with the dimensionality of the plan space, it is desirable to store the distribution of the total number of points across the cells in database histograms (see step 708). Thus, according to example embodiments, each query plan in the plan space has its own histogram for each of the subspaces, which provides an approximation of the distribution of points in the plan space.

6. Online Query Plan Prediction

In an online query plan prediction, a sample set is empty when the execution of the workload begins. For each query instance 100 of the workload, the prediction algorithm determines whether a cached plan may be used 106. If not, the query is sent to the optimizer 116, whereby the generated query plan 114 is saved in the plan cache 108 and the corresponding plan space point for the query is added to the set.

Thus, plan predictions are delayed until the algorithm has obtained sufficient input. From a practical point of view, this window is short. However, it is possible to shorten the warm-up period farther to achieve higher precision. The optimizer is invoked with some probability even if the algorithm produces a prediction. Positive feedback is not used, however, because inserting predictions believed (but not known) to be correct into the sample set may shorten the warm-up period but this has the potential to produce false positive input. Rather, negative feedback should be used, i.e. correction of underlying prediction models to remove support for an erroneous prediction. Wien a prediction error is identified at a plan space point, the optimizer is invoked to obtain a correct query plan and an optimized point is added to the sample set by inserting it into the database histograms, which changes the plan densities, and reduces support for the previously predicted plan.

FIG. 8 is a flowchart of a database query according to example embodiments. First, in step 802, a database query is received. Next, in step 804, a plan space point in plan space is determined for the database query. In step 806, histograms for different query plans and hash functions are consulted and information is combined to determine a query plan with a highest predicted density within a predetermined radius from the plan space point. In step 808, the confidence model described above is applied in order to avoid an unsafe query plan prediction, e.g. it is determined whether the predicted density of plan space points within a particular region that is a predetermined radius from the plan space point is greater than a threshold. If the confidence check is satisfied, a query plan prediction is provided (step 818). After a query plan prediction is provided in step 818, then the plan cache is tested in step 820 to determine whether the plan cache includes the predicted query plan. In step 820, if the predicted query plan resides in the plan cache, the query plan is retrieved from the plan cache in step 822, executed by the query processor in step 824, and in step 826 the database query results are received.

However, if the confidence check is not satisfied in step 808, no query plan prediction is made (step 810) and the query plan is optimized in step 812. The generated query plan is then saved to the plan cache in step 814 and the plan space point is added to the density distribution in the plan space in step 816. The database query is executed using the generated query plan in step 824 and database results are received in step 826.

In addition, if the confidence check is satisfied in step 808, and a query plan prediction is made in step 818, but the predicted query plan does not reside in the plan cache as determined in step 820, the query plan prediction is discarded and the query plan is optimized in step 812. The generated query plan is then saved to the plan cache in step 814 and the plan space point is added to the density distribution in the plan space in step 816. The database query is executed in step 824 using the generated query plan and finally, in step 826, database query results are received.

Generally, the BASELINE algorithm cannot scale well because its space and time performance is a function of the number of points observed in the plan space. However, the three approximations over BASELINE including NAÏVE, APPROXIMATE-LSH and APPROXIMATE-LSH-HISTOGRAMS discussed above have complexity which is independent of the number of observed points. For instance, the BASELINE algorithm is found to have a complexity of $O(|number\ of\ points|)$ per prediction and the number of bytes of space required is the number of points*8. The NAIVE algorithm has a complexity of $O(1)$ per prediction and takes up a number of bytes calculated based on the number of query plans*the number of buckets per grid*8. For the APPROXIMATE-LSH and APPROXIMATE-LSH-HISTOGRAMS algorithms, let T denote the number of randomized locality-sensitive hash functions used. The APPROXIMATE-LSH algorithm has a complexity of $O(|T|)$ per prediction and takes up a number of bytes calculated based on the number of query plans*the number of buckets per grid*8*T. Finally, the APPROXIMATE-LSH-HISTOGRAMS algorithm has a complexity of $O(|T|)$ and takes up a number of bytes calculated based on the number of query plans*the number of buckets per database histogram*12*T.

Whenever a plan prediction is made for a query instance corresponding to a plan space point, the execution cost is tracked. The histograms store average execution costs for points within each bucket and so the average execution costs of the sample points around the plan space point can be estimated via a histogram range query. The computed average cost should be within an error bound of the estimated cost. If the cost difference is beyond a threshold, it may be concluded that a false prediction has been made. Three sets of estimations are stored. The precision of the last k predictions for each query plan, overall precision and overall recall are stored. These estimations allow identification of query plans with caching potential, to detect changes in the optimizer's plan selections, and to abort plan caching if necessary. If precision estimates for a query template fall below a threshold, all histograms for that query template are deleted and sample points begin to be accumulated from scratch.

Thus, parametric plan caching using density based clustering exploits locality-sensitive hashing as a pre-processing step to thereby allow clusters in plan spaces to be efficiently stored in database histograms and queried in constant time. This lossy method allows for greater space and time efficiencies and allows for a controllable trade-off in prediction error. In addition, the approach is adaptive and avoids redundant pre-processing of plan spaces.

7. Example Computer Implementation

In an example embodiment of the present invention, the systems and methods of the present invention described herein are implemented using well known computers, such as computer 900 shown in FIG. 9.

Computer 900 can be any commercially available and well known computer capable of performing the functions described herein, such as computers available from International Business Machines, Apple, Sun, HP, Dell, Compaq, Digital, Cray, etc.

Computer 900 includes one or more processors (also called central processing units, or CPUs), such as a processor 906. The processor 906 is connected to a communication bus 904. Processors 906 may include any conventional or special purpose processor, including, but not limited to, digital signal processor (DSP), field programmable gate array (FPGA), and application specific integrated circuit (ASIC).

Computer 900 includes one or more graphics processing units (also called GPUs), such as GPU 907. GPU 907 is a specialized processor that executes instructions and programs selected for complex graphics and mathematical operations in parallel.

Computer 900 also includes a main or primary memory 908, such as random access memory (RAM). The primary memory 908 has stored therein control logic 928A (computer software), and data.

Computer 900 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well-known manner.

Computer 900 also includes input/output/display devices 922, such as monitors, keyboards, pointing devices, touch-screen displays, etc.

Computer 900 further includes a communication or network interface 918. The network interface 918 enables the computer 900 to communicate with remote devices. For example, the network interface 918 allows computer 900 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from computer 900 via the communication medium 924B. More particularly, the computer 900 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 900, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

8. Conclusion

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method comprising:
   receiving, by at least one processing device, a query instance according to a query template having a set of parameters;
   determining, by the at least one processing device, a plan space point for the query instance, the plan space point based upon the set of parameters; and
   predicting, by the at least one processing device, a predicted query plan for the plan space point based upon precision, the precision being a ratio of a number of correct predictions to a number of NULL-free predictions, the predicted query plan selected from a map of query plans according to a confidence threshold from a plan cache that includes at least one histogram, each histogram representative of a cached query plan in the plan cache combined with a previously-selected locality-sensitive hashing function, the histogram storing a frequency distribution of a mapping of sample plan points for the cached query plan by the locality-sensitive hashing function.

2. The method of claim 1, further comprising:
adding the plan space point to the frequency distribution of the sample plan points.

3. The method of claim 2, further comprising:
executing the query instance using the predicted query plan and receiving query results.

4. The method of claim 1, further comprising:
predicting the predicted query plan by selecting a query plan with a highest density of the sample plan points within a specified radius of the plan space point.

5. The method of claim 4, further comprising:
executing a confidence sanity check and determining if the predicted query plan has a density significantly greater than a particular threshold within a particular region in the plan space.

6. The method of claim 5, further comprising:
detecting changes in the plan space as a result of fluctuations in one of workload, data characteristics and system state, and optimizing the sample plan points.

7. The method of claim 1, further comprising:
predicting the predicted query plan based upon precision and recall, the recall being a ratio of the number of correct predictions to a total number of predictions.

8. The method of claim 3, further comprising:
evaluating the query results and optimizing the predicted query plan when a prediction error occurs; and
removing the plan space point and inserting an optimized plan space point into the frequency distribution of sample plan points.

9. A system comprising:
at least one processing device configured to process:
a query plan predictor configured to:
receive a query instance according to a query template having a set of parameters;
determine a plan space point for the query instance, the plan space point based upon the set of parameters; and
predict a predicted query plan for the plan space point based upon precision, the precision being a ratio of a number of correct predictions to a number of NULL-free predictions, the predicted query plan selected from a map of query plans according to a confidence threshold from a plan cache that includes at least one histogram, each histogram representative of a cached query plan in the plan cache combined with a previously-selected locality-sensitive hashing function, the histogram storing a frequency distribution of a mapping of sample plan points for the cached query plan by the locality-sensitive hashing function.

10. The system of claim 9, wherein the query plan predictor is further configured to:
add the plan space point to the frequency distribution of the sample plan points.

11. The system of claim 10, wherein the system further comprises:
a query executor configured to execute the query instance using the predicted query plan and receive query results.

12. The system of claim 9, wherein the query plan predictor is further configured to:
predict the predicted query plan by selecting a query plan with a highest density of the sample points within a specified radius of the plan space point.

13. The system of claim 12, wherein the query plan predictor is further configured to:
execute a confidence sanity check and determine if the predicted query plan has a density significantly greater than a particular threshold within a particular region in the plan space.

14. The system of claim 13, wherein the query plan predictor is further configured to:
detect changes in the plan space as a result of fluctuations in one of workload, data characteristics and system state, and optimize the sample plan points.

15. The system of claim 9, wherein the query plan predictor is further configured to:
predict the predicted query plan based upon precision and recall, the recall being a ratio of the number of correct predictions to a total number of predictions.

16. The system of claim 11, wherein the query plan predictor is further configured to:
evaluate the query results and optimize the predicted query plan when a prediction error occurs; and
remove the plan space point and insert an optimized plan space point into the frequency distribution of sample plan points.

17. A non-transitory computer-readable medium having instructions stored thereon, the instructions causing at least one computing device to perform operations, the operations comprising:
receiving a query instance according to a query template having a set of parameters;
determining a plan space point for the query instance, the plan space point based upon the set of parameters; and
predicting a predicted query plan for the plan space point based upon precision, the precision being a ratio of a number of correct predictions to a number of NULL-free predictions, the predicted query plan selected from a map of query plans according to a confidence threshold from a plan cache that includes at least one histogram, each histogram representative of a cached query plan in the plan cache combined with a previously-selected locality-sensitive hashing function, the histogram storing a frequency distribution of a mapping of sample plan points for the cached query plan by the locality-sensitive hashing function.

18. The non-transitory computer-readable medium of claim 17, the operations further comprising:
adding the plan space point to the frequency distribution of sample plan points; and
executing the query instance using the predicted query plan and receiving query results.

19. The method of claim 2, the adding further comprising:
adding the plan space point to a workload history, the plan space point including the predicted query plan and a cost of execution.

20. The system of claim 10, wherein the query plan predictor is further configured to:
add the plan space point to a workload history, the plan space point including the predicted query plan and a cost of execution.

* * * * *